United States Patent
Shi et al.

(10) Patent No.: US 10,647,612 B2
(45) Date of Patent: May 12, 2020

(54) FLY ASH CEMENTITIOUS COMPOSITIONS

(71) Applicants: Xianming Shi, Pullman, WA (US); Gang Xu, Pullman, WA (US)

(72) Inventors: Xianming Shi, Pullman, WA (US); Gang Xu, Pullman, WA (US)

(73) Assignee: Washington State University, Pullman, WA (US)

( * ) Notice: Subject to any disclaimer, the term of this patent is extended or adjusted under 35 U.S.C. 154(b) by 0 days.

(21) Appl. No.: 15/753,534

(22) PCT Filed: Aug. 26, 2016

(86) PCT No.: PCT/US2016/049048
§ 371 (c)(1),
(2) Date: Feb. 19, 2018

(87) PCT Pub. No.: WO2017/040308
PCT Pub. Date: Mar. 9, 2017

(65) Prior Publication Data
US 2018/0257989 A1    Sep. 13, 2018

Related U.S. Application Data

(60) Provisional application No. 62/212,000, filed on Aug. 31, 2015, provisional application No. 62/211,955, filed on Aug. 31, 2015, provisional application No. 62/330,427, filed on May 2, 2016.

(51) Int. Cl.
| | | |
|---|---|---|
| *C04B 28/02* | (2006.01) | |
| *C04B 14/02* | (2006.01) | |
| *C04B 18/16* | (2006.01) | |
| *C04B 22/06* | (2006.01) | |
| *C04B 22/12* | (2006.01) | |
| *C04B 22/14* | (2006.01) | |
| *C04B 22/16* | (2006.01) | |
| *C04B 103/00* | (2006.01) | |
| *C04B 103/10* | (2006.01) | |

(52) U.S. Cl.
CPC ......... *C04B 28/021* (2013.01); *C04B 14/026* (2013.01); *C04B 18/162* (2013.01); *C04B 22/064* (2013.01); *C04B 22/124* (2013.01); *C04B 22/143* (2013.01); *C04B 22/147* (2013.01); *C04B 22/16* (2013.01); *C04B 2103/0014* (2013.01); *C04B 2103/10* (2013.01); *Y02W 30/95* (2015.05)

(58) Field of Classification Search
CPC ... C04B 14/026; C04B 18/162; C04B 22/064; C04B 22/124; C04B 22/143; C04B 22/147; C04B 22/16; C04B 28/021; C04B 2103/0014; C04B 2103/10; Y02W 30/95
See application file for complete search history.

(56) References Cited

U.S. PATENT DOCUMENTS

| | | | | |
|---|---|---|---|---|
| 5,601,643 | A | * | 2/1997 | Silverstrim ............. C04B 12/04 106/606 |
| 8,202,362 | B2 | * | 6/2012 | Davidovits ........... C04B 12/005 106/600 |
| 9,290,416 | B1 | * | 3/2016 | Allouche ............ C04B 40/0032 |
| 2009/0071374 | A1 | * | 3/2009 | Van Deventer ....... B28C 7/0418 106/600 |
| 2012/0260829 | A1 | * | 10/2012 | Pershikova ........... C04B 12/005 106/804 |
| 2015/0007751 | A1 | * | 1/2015 | Gupta .................... C04B 14/06 106/624 |

FOREIGN PATENT DOCUMENTS

| | | |
|---|---|---|
| CN | 104446175 | 3/2015 |
| WO | WO 2013/096990 | 7/2013 |
| WO | WO-2013148843 A2 * | 10/2013 |

OTHER PUBLICATIONS

Saafi et al "Enhanced properties of graphenefly ash geopolymeric composite cement", Cement and Concrete Research 67, 292-299. (Year: 2015).*
Saafi et al "Multifunctional properties of carbon nanotube/fly ash geopolymeric nanocomposites" Construction and Building Materials 49, 46-55. (Year: 2013).*
Abdullah et al., "The effect of various chemical activators on pozzolanic reactivity: a review," *Scientific Research and Essays*, 7(7): 719-729, Feb. 23, 2012.
Berry et al., "Performance of 100% Fly Ash with Recycled Glass Aggregate," *ACI Materials Journal*, 108(4): 378-384, Jul.-Aug. 2011.
Du et al., "Laboratory Investigation into the Mix Design of High-Volume Fly Ash Mortars," *Proceedings of the Transportation Research Board 95th Annual Meeting*, Jan. 10-14, 2016, Washington, D.C. (abstract only).
International Search Report and Written Opinion issued for International Application No. PCT/US2016/049048 dated Nov. 22, 2016.
Pan et al., "Mechanical properties and microstructure of a graphene-oxide cement composite," *Cement & Green Composites*, vol. 58, pp. 140-147, 2015.

(Continued)

*Primary Examiner* — Anthony J Green
(74) *Attorney, Agent, or Firm* — Klarquist Sparkman, LLP

(57) ABSTRACT

A composition comprising:
(a) fly ash cementitious binder; and
(b) a chemical activator selected from sodium silicate, potassium silicate, sodium sulfate, sodium phosphate, calcium sulfate, potassium sulfate, potassium phosphate, CaO, $Fe_2O_3$, sodium chloride, calcium chloride, fine fraction of concrete waste from construction or demolition, cement kiln dust, or a combination thereof, wherein the fly ash is the only cementitious binder present in the composition and the CaO activator, if present, is present in an amount ≤10 weight percent, based on the total dry weight of the composition.

35 Claims, 4 Drawing Sheets

(56) References Cited

OTHER PUBLICATIONS

Panda et al., "Effect of sodium silicate on strengthening behavior of fly ash compacts," *International Journal of Current Research*, 4(2): 244-246, Feb. 29, 2012.

Romani et al., *Graphene Oxide as a Cement Reinforcing Additive*, Thesis submitted at Politecnico di Milano, School of Industrial and Information Engineering Master of Science in Materials Engineering and Nanotechnology, Jul. 31, 2015.

Shi et al., "Acceleration of the Reactivity of Fly Ash by Chemical Activation," *Cement and Concrete Research*, 25(1): 15-21, Jan. 1995.

Singh et al., "Cementitious binder from fly ash and other industrial wastes," *Cement and Concrete Research*, 29(3): 309-314, Dec. 31, 1999.

Xie et al., "Upcycling of Waste Materials: Green Binder Prepared with Pure Coal Fly Ash," *Journal of Materials in Civil Engineering*, 28(3): 1-59, Sep. 2, 2015.

Xu et al., "Exploratory Investigation into Upcycling of Coal Fly Ash as Sole Binder for Mortars," *Proceedings of the Transportation Research Board 95th Annual Meeting*, Jan. 10-14, 2016, Washington, D.C.

Xu et al., "Graphene Oxide Modified Pervious Concrete with Fly Ash as Sole Binder," *Proceedings of the First International Conference on Transportation Infrastructure and Materials*, 2016.

\* cited by examiner

FLY ASH CEMENTITIOUS COMPOSITIONS

CROSS REFERENCE TO RELATED APPLICATIONS

This application is the U.S. National Stage of International Application No. PCT/US2016/049048, filed Aug. 26, 2016, which was published in English under PCT Article 21(2), which in turn claims the benefit of U.S. Provisional Application No. 62/211,955, filed Aug. 31, 2015, U.S. Provisional Application No. 62/212,000, filed Aug. 31, 2015, and U.S. Provisional Application No. 62/330,427, filed May 2, 2016, all of which are incorporated herein by reference.

ACKNOWLEDGEMENT OF GOVERNMENT SUPPORT

This invention was made with government support under grant no. DTRT13-G-UTC59 awarded by the U.S. Department of Transportation through subaward no. UAF140103-1 from the University of Alaska-Fairbanks. The government has certain rights in the invention

BACKGROUND

It is well known that Portland cement has some environmental concerns: the high-energy consumption and the release of air pollutants (NO, and $SO_2$) and greenhouse gases ($CO_2$) related to mining and manufacture.

Significant quantities of fly ash are generated every year. In 2013, the United States produced 115 million tons of coal ashes. While only 45 percent were used beneficially, nearly 64 million tons were disposed of. Based on the analytical CaO content, fly ash can be divided into high-calcium fly ash (CaO content >10%) and low-calcium fly ash (CaO Content <10%). Recent years have seen increasing use of younger lignite or sub-bituminous coal at power plants, which led to increasing availability of high-calcium fly ashes.

ASTM C 618 defines two categories of fly ash: Class F fly ash (FFA) and Class C fly ash (CFA). FFA is produced from the burning anthracite or bituminous coal and contains less than 20% CaO. CFA is produced from the burning of lignite or sub-bituminous coal and contains more than 20% CaO.

SUMMARY

Disclosed herein in one embodiment is a composition comprising:
 (a) fly ash cementitious binder; and
 (b) a chemical activator selected from sodium silicate, potassium silicate, sodium sulfate, sodium phosphate, calcium sulfate, potassium sulfate, potassium phosphate, CaO, $Fe_2O_3$, sodium chloride, calcium chloride, fine fraction of concrete waste from construction or demolition, cement kiln dust, or a combination thereof,
 wherein the fly ash is the only cementitious binder present in the composition and the CaO activator, if present, is present in an amount ≤10 weight percent, based on the total dry weight of the composition.

Also disclosed herein is a composition comprising:
 (a) fly ash cementitious binder; and
 (b) graphene oxide,
 wherein the fly ash is the only cementitious binder present in the composition.

Further disclosed herein is a method comprising;
 (i) forming a mixture of (a) fly ash cementitious binder; and (b) a chemical activator selected from sodium silicate, potassium silicate, sodium sulfate, sodium phosphate, calcium sulfate, potassium sulfate, potassium phosphate, CaO, $Fe_2O_3$, sodium chloride, calcium chloride, fine fraction of concrete waste from construction or demolition, cement kiln dust, or a combination thereof, wherein the fly ash is the only cementitious binder present in the composition and the CaO activator, if present, is present in an amount ≤10 weight percent, based on the total dry weight of the composition; and
 (ii) curing the mixture at ambient temperature and ambient pressure.

Additionally disclosed herein is a method comprising:
 (i) forming a mixture of (a) fly ash cementitious binder and (b) graphene oxide,
 wherein the fly ash is the only cementitious binder present in the composition; and
 (ii) curing the mixture at ambient temperature and ambient pressure.

The foregoing will become more apparent from the following detailed description, which proceeds with reference to the accompanying figures.

BRIEF DESCRIPTION OF THE DRAWINGS

(FIG. 2B) 28-day $f_c'$ model.

(FIG. 4A) Run 22 of DoE I (1000× magnification); (FIG. 4B) BSE image of Run 22 of DoE I (1000× magnification); (FIG. 4C) Run 22 of DoE I (10000× magnification); (FIG. 4D) Run 22 of DoE I (10000× magnification); (FIG. 4E) Run 23 of DoE 2 (2000× magnification); (FIG. 4F) BSE image of Run 23 of DoE 2 (2000× magnification).

DETAILED DESCRIPTION

Figure 1:
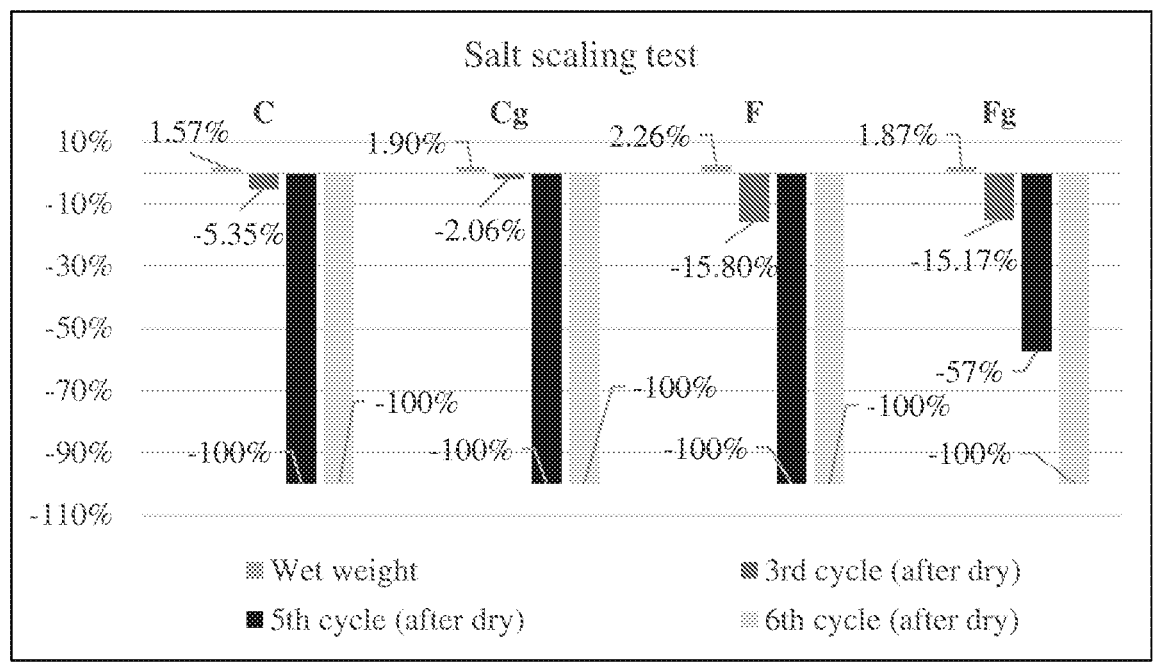
FIG. 1 is a graph showing weight loss during salt scaling test.

Disclosed herein are cementitious compositions that include fly ash. In certain embodiments, the fly ash is the only cementitious binder present in the composition. In certain embodiments, the fly ash comprises greater than 10 weight percent CaO, based on the total dry weight of the fly ash. In certain embodiments, the fly ash comprises less than 25 weight percent CaO, and has a weight ratio of $Al_2O_3/(Al_2O_3+SiO_2)$ of at least 0.40, based on the total dry weight of the fly ash. In certain embodiments, the fly ash is a Class C fly ash. In certain embodiments, the fly ash is a Class F fly ash. In certain embodiments, the fly ash has a loss-on-ignition of no more than 3 percent by mass.

In certain embodiments, the fly ash is present in a concrete mixture in an amount of at least 10, particularly at least 15, and most particularly at least 20, weight percent, based on the total weight of the concrete mixture. In certain embodiments, the fly ash is present in a mortar or grout mixture. In an amount of at least 15, particularly at least 20, and most particularly at least 30, weight percent, based on the total dry weight of the mortar or grout mixture. In certain embodiments, the fly ash is present in a cementitious paste in an amount of at least 85, particularly at least 90%, and most particularly at least 95, weight percent, based on the total dry weight of the cementitious paste.

In certain embodiments, the composition includes a chemical activator selected from sodium silicate, potassium silicate, sodium sulfate, sodium phosphate, calcium sulfate (e.g., gypsum), potassium sulfate, potassium phosphate, CaO, $Fe_2O_3$, sodium chloride, calcium chloride, fine fraction of concrete waste from construction or demolition (i.e., fraction passing the ⅜ in (9.5 mm) sieve and almost entirely passing the No. 4 (4.75 mm) sieve), cement kiln dust, or a combination thereof. In certain embodiments, the composition also includes a chemical activator selected from sodium silicate, sodium sulfate, CaO, calcium chloride, or a combination thereof. The chemical activator is an ingredient of the composition that is separate and distinct from any constituent that may be present in the fly ash as added to the composition. In certain embodiments, the composition includes a sodium silicate activator. In certain embodiments, the composition includes a sodium sulfate activator. In certain embodiments, the composition includes a sodium phosphate activator. In certain embodiments, the composition includes a CaO activator. In certain embodiments, the composition includes a $Fe_2O_3$ activator. In certain embodiments, the composition includes a calcium chloride activator. In certain embodiments, the composition includes a sodium chloride activator. In certain embodiments, the composition includes at least one activator selected from sodium silicate, sodium sulfate, CaO, or calcium chloride. In certain embodiments, the composition includes at least two activators selected from sodium silicate, sodium sulfate, CaO, or calcium chloride. In certain embodiments, the composition includes at least three activators selected from sodium silicate, sodium sulfate, CaO, or calcium chloride. In certain embodiments, the composition includes a sodium silicate activator, a sodium sulfate activator, a CaO activator, and a calcium chloride activator.

In certain embodiments, the composition includes 1 to 7 weight percent sodium silicate or potassium silicate activator, based on the weight of the fly ash. In certain embodiments, the composition includes 0 to 3, or 0 to 1, or 1 to 3, or 0.2 to 2, weight percent sodium sulfate, potassium sulfate, sodium phosphate or potassium phosphate activator, based on the weight of the fly ash. In certain embodiments, the composition includes 2 to 10 weight percent CaO activator, based on the weight of the fly ash. In certain embodiments, the composition includes 0 to 2 weight percent $Fe_2O_3$ activator, based on the weight of the fly ash. In certain embodiments, the composition includes 0 to 2, or 0 to 0.5, or 0 to 1, or 0.5 to 1, or 0.5 to 2, or 0.2 to 2, weight percent calcium chloride activator or sodium chloride, based on the weight of the fly ash.

In certain embodiments, the CaO activator, if present, is present in an amount of ≤10 weight percent, based on the total dry weight of the composition.

In certain embodiments, the $Fe_2O_3$ activator, if present, is present in an amount of ≤2 weight percent, based on the total dry weight of the composition.

In certain embodiments, the composition also includes a graphene oxide additive. In certain embodiments, the graphene oxide is added to the composition in the form of an aqueous suspension of graphene oxide. In certain embodiments, the graphene oxide is present in an amount of 0.03 weight percent, based on the total dry weight of the composition. In certain embodiments, the graphene oxide is present in an amount of 0.01 to 0.10 weight percent, based on the total dry weight of the composition.

In certain embodiments, the composition also includes multiwall carbon nanotubes. Multiwall nanotubes can be considered as multiple sheets of graphite that have been rolled up into a single tube. Oxygen-, sulfur-, and nitrogen-containing functional groups attached to carbon nanotube surfaces are specific groups of atoms or bonds, which may undergo chemical reaction(s) with fly ash composition and improve its performance.

Also disclosed herein is a slurry that includes the cementitious composition and water.

Further disclosed herein is a concrete composition including: (a) the cementitious binder composition according to any of the various disclosed embodiments; and (b) (concrete) aggregates.

The aggregate may be selected from crushed stone, gravel, sand, light-weight aggregates, heavy-weight aggregates, synthetic particles, recycled particles, or combinations thereof. The aggregate can be classified/selected according to an aggregate characteristic size, which can correspond, for example, to the largest, median, or smallest size particle in the aggregate particle size distribution, such as 37.5 mm (1.5 in sieve passing), 25.0 mm (1 in), 19.0 mm (0.75 in), 12.5 mm (0.5 in), 9.5 mm (0.375 in), 4.75 mm (No. 4), 2.36 mm (No. 8), 1.18 mm (No. 16), 0.60 mm (No. 30), 0.30 mm (No. 50), 0.15 mm (No. 100), 0.075 mm (No. 200), or ranges therebetween, based on standard sieve sizes/techniques. The aggregate generally includes a combination of sand (fine aggregate) and stone/gravel (coarse aggregate). The aggregate suitably is present in an amount ranging from about 25 wt. % to about 1000 wt. % relative to the cementitious binder (e.g., at least about 50%, 100%, 200%, 300%, or 400% and/or up to about 200%, 300%, 400%, 500%, 600%, or 800% by weight relative to the cementitious binder). Such amounts can apply to an anhydrous concrete composition, a hydrated concrete composition (e.g., pourable mixture to be applied to a substrate), and/or to a cured concrete composition.

The concrete or mortar composition can be in a hydrated or an anhydrous form. For example, the concrete or mortar composition can be in the form of a particulate composition substantially free from water (e.g., a particulate/powder mixture of the cement binder, particulate glass, particulate metal salt and/or mineral, aggregate, and any other additives; generally free from added water, such as only having a water content at equilibrium moisture level with environmental moisture). Alternatively, the concrete or mortar composition can further include (added) water (e.g., about 10 wt. % to about 65 wt. % relative to the cementitious binder composition as noted above).

Other additives can be included in the cementitious binder composition and/or concrete or mortar composition. Representative additive levels ranging from about 0.1 wt. % to about 5 wt. % relative to the cementitious binder. Suitable additives include retarders, air entrainers, plasticizers, pigments, corrosion inhibitors, bonding agents, and/or pumping aids. Similarly, additives including dispersed reinforcements such as steel fibers, glass fibers, plastic fibers, or other fibers may be included to improve mechanical strength of an eventual concrete composition.

The cementitious binder composition can be in a hydrated or an anhydrous form. For example, the cementitious binder composition can be in the form of a particulate/powder composition substantially free from water (e.g., a particulate/powder mixture of the cement, particulate glass, reactive particulate metal salt and/or mineral, and any other additives; generally free from added water, such as only having a water content at equilibrium moisture level with environmental moisture). Alternatively, the cementitious binder composition can include (added) water (e.g., an added amount of water that is sufficient for the purpose of forming a hardened cementitious material, such as an amount sufficient to form a pourable or shapable paste-like or slurry material). For example, the water can be present in an amount ranging from about 10 wt. % to about 60 wt. % relative to the cementitious binder (e.g., at least about 10%, 20%, or 25% and/or up to about 30%, 40%, 50%, 60%, or 70% by weight relative to the cement; alternatively or additionally at least about 10%, 15%, or 20% and/or up to about 25%, 30%, 35%, 40%, 50%, or 60% by weight relative to the cementitious binder composition including the added water).

Further disclosed herein is a method for curing the cementitious binder composition, the method including: (a) applying the cementitious binder composition according to any of the various disclosed embodiments (e.g., further including water in the binder composition) to a substrate or other surface; and (b) curing the cementitious binder composition for a selected period, thereby forming a cured cement-based composition including a hydration reaction product of the cementitious binder composition and water.

In certain embodiments, the composition may be used as a cementitious binder without any aggregate (i.e., the paste phase). In certain embodiments, the composition further comprises a fine aggregate (passing #4 sieve but retain on #200 sieve) and may be used as construction mortar, repair mortar, or grout. In certain embodiments, the composition further comprises a fine aggregate and a coarse aggregate (retain on #4 sieve) and may be used as concrete mixture.

The surfaces/substrates for application are not particularly limited, and can include any solid surface such as ground or a compacted base (e.g., for laying a road outside, or a building floor, or footing), formwork (e.g., for construction of wall, beam, column, or other structural building element), another cured cement/concrete surface (e.g., for forming a multi-layered structure in road, building, or other context). The applied area can further include one or more reinforcing structures such as bars (e.g., steel, other metal, or composite material) to be contained within the concrete matrix upon curing. Curing can be accomplished in the presence of moisture at ambient or elevated temperature. The selected period for curing can be at least and/or up to 1, 2, 3, 5, 7, 14, or 28 days prior to putting the cured composition into normal use such as a road, floor, structural element, or substrate for further cement/concrete application/curing.

The cured compositions can be characterized in terms of their relative strength and/or set time properties.

In some embodiments, the composition has an initial setting time in the range of 90 to 150 minutes.

The cementitious composition disclosed herein may be used for making any type of concrete such as, for example, high-performance concrete, ultra-high-performance concrete, micro-reinforced ultra-high-performance concrete, self-consolidating concrete, vacuum concrete, shotcrete, pervious concrete, or cellular concrete.

In certain embodiments, the compositions do not include Portland cement.

In certain embodiments disclosed herein a low-reactivity, high-calcium fly ash is used as the sole binder for a cementitious composition (e.g., pervious concrete) with alkali activation at room temperature. Graphene oxide (GO) was also used to facilitate the polymerization of reaction products from alkali activation. A fly ash based pervious concrete could not only reduce the demand for Portland cement, but also divert the fly ash from industrial wastes, which could otherwise cause serious environmental problems. Table 1 below lists certain fly ash properties.

TABLE 1

| fly ash spheres reactivity [13] | | | |
|---|---|---|---|
| | CaO (% wt.) | $Al_2O_3/(Al_2O_3 + SiO_2)$ | Reactivity |
| High-Ca-spheres | >25 | ±0.45 | High |
| Low-Ca-spheres | <25 | ±0.45 | Low |
| Ca-free-spheres | ±0 | <0.45 | Inert |

Pervious concrete is a special type of concrete with a high porosity that allows water from precipitation and other sources to pass through directly. The infiltration effect provided by pervious concrete pavements can recharge the groundwater and reduce the amounts of total suspended solids, total phosphors, total nitrogen and metals in the ground water.

Also disclosed herein is the beneficial use of low-reactive Class C fly ash as a cementitious binder at room temperature. A first group of mortar samples was made from low-reactive Class C fly ash with additives to improve workability, strength and durability. Compressive strength test, surface resistivity test, mini slump test, and SEM/BSE were performed. The testing results indicate that the low-reactive Class C fly ash mortar showed a relatively low compressive strength. Then a second group of mortar samples was made from low-reactive Class C fly ash with chemical activators: sodium silicate, sodium sulfate, quicklime and calcium chloride. The testing results indicate that the use of chemical activators led to a noticeable improvement in strength and microstructure, primarily due to (1) more dissolution of fly ash spheres and (2) more formation of amorphous gel. Uniform Design scheme was adopted to develop compressive strength models and to investigate the influence of key additives on the compressive strength. The close correlation between the test response and the predicted response proved the fitness of models. SEM/BSE analysis tools also can shed light on the hydration mechanism of fly ash.

Example 1

Experimental Preparation
Materials
The high-calcium fly ash used in this study was obtained from a western U.S. power plant. Fly ash composition was examined by X-ray fluorescence (XRF) analysis and are presented in Table 2. As defined in Table 1, it can also be considered as a low-reactivity, high-calcium fly ash.

TABLE 2

| Chemical composition of the fly ash (% wt.) | | | | | | | | | | |
|---|---|---|---|---|---|---|---|---|---|---|
| | $SiO_2$ | $Al_2O_3$ | $Fe_2O_3$ | $Na_2O$ | $K_2O$ | $TiO_2$ | MgO | CaO | MnO | L.O.I* | Origin |
| CFA 1 | 23.5 | 13.8 | 4.8 | 6.3 | 0.4 | 1.3 | 4.2 | 23.2 | 0.1 | 0.15 | OR |

The amount of chemical activators designed to facilitate the dissolution of fly ash is listed as following:

Water glass, i.e., sodium silicate ($Na_2SiO_3.9H_2O$): 7% by weight of fly ash
Sodium sulfate ($Na_2SO_4.10H_2O$): 1% by weight of fly ash
Quicklime (CaO): 5% by weight of fly ash
Calcium chloride ($CaCl_2.2H_2O$): 1% by weight of fly ash GO used in this study were produced by using a modified Hummer's method, which mainly involves chemical oxidation of the graphite. The as-produced GO was pasty, which was diluted with deionized water first and then sonicated for 45 min by using a Branson digital sonifier (S-450D, 400 W, 50% amplitude) to produce stable GO suspension (max. 3 g/L). The GO suspension with the designed GO content (0.03% by weight of binder) was then ready for the production of GO modified binder.

One type of single-sized coarse aggregate, crushed limestone in ⅜-inch size with 100% passing the ½-inch sieve and 100% retained on the ⅜-inch sieve, was used as coarse aggregate. The properties of this coarse aggregate were listed in the Table 3. One commercially available glass powder recycled from industrial feedstocks was used as a micro-filler in the pervious concrete mix design, the properties of this glass powder was listed in Table 4. The intent of using glass powder in the mix design is to incorporate more waste materials in the pervious concrete. A type I/II cement (ASTM C150) was used in the mix design of control groups, cement properties provided by the manufacturer are listed in Table 4 as well.

TABLE 4-continued

Physical and chemical properties of glass powder and cement

|  | Glass powder | Cement |
|---|---|---|
| $d_{98}$ top size (μm) | 40 | — |
| $D_{50}$ median size (μm) | 8-9 | — |
| $SiO_2$ (wt. %) | 50-55% | 21% |
| CaO (wt. %) | 20-25% | 65% |
| $Al_2O_3$ (wt. %) | 14-20% | 4% |
| $Fe_2O_3$ (wt. %) | <1% | 3.5% |
| $Na_2O + K_2O$ (wt. %) | 8-14% | <0.9% |
| Loss on Ignition (wt. %) | <0.5% | <1.1% |
| Tricalcium Silicate $C_3S$ (wt. %) | — | 55% |
| Tricalcium Aluminate $C_3A$ (wt. %) | — | 6.2% |

Mix Proportions

Four groups of pervious concrete were designed to investigate the performance of fly ash based pervious concrete and how the addition of GO content influences the void ratio, strength, water permeability, Young's modulus and durability of pervious concrete. The proportions of four mixes are shown in Table 5. Triethanolamine (TEA) was used to improve early-age strength of pervious concrete. Air-entraining (AE) agent, BASF MB-AE 90, and high-range water reducer (HRWR), BASF MasterGlenium 7920, were employed to improve the workability and freeze-thaw resistance of pervious concrete.

TABLE 5

Pervious concrete material proportions used in this study

| Mix Design | Agg. Size (inch) | Agg. (kg/m³) [a/b] | Cement (kg/m³) | Fly ash CFA1 (kg/m³) | Water (kg/m³) [w/b] | GO (g/100 kg binder) | TEA (ml/100 kg binder) | HRWR (ml/100 kg binder) | AE (ml/100 kg binder) |
|---|---|---|---|---|---|---|---|---|---|
| Cement | ⅜ | 1425 [4.45] | 320 | — | 80 [0.25] | — | 40 | 300 | 30 |
| Cement + GO | ⅜ | 1425 [4.45] | 320 | — | 80 [0.25] | 96 | 40 | 300 | 30 |
| Fly ash | ⅜ | 1425 [4.0] | — | 358 | 97 [0.27] | — | 40 | 1000 | 30 |
| Fly ash + GO | ⅜ | 1425 [4.0] | — | 358 | 97 [0.27] | 108 | 40 | 1000 | 30 |

*2% (by weight of cement or fly ash) glass powder used for all mix designs
*a/b = aggregate-binder-ratio
*w/b = water-binder-ratio
*1 lb/yd³ = 0.5933 kg/m³
*1 fl oz/cwt = 65.2 mL/100 kg
*designed amount of chemical activators is not listed in this table

TABLE 3

Properties of aggregate used in the pervious concrete

| Aggregate type | Crushed limestone |
|---|---|
| Aggregate size | ⅜ inch |
| Unit weight (lbs/ft³) | 90.2 |
| Specific gravity | 2.6 |
| Water absorption | 2.5% |

TABLE 4

Physical and chemical properties of glass powder and cement

|  | Glass powder | Cement |
|---|---|---|
| Specific gravity | 2.5 | 3.2 |
| Bulk Density (lbs/ft³) | 43 | 76 |

Specimen Fabrication

The pervious concrete mixes in Table 5 were used as four separate batches. 4 in. diameter×8 in. height cylinders were prepared by using an improved standard concrete mixing procedure. Using the standard concrete mixing procedure, it was found that pervious concrete samples failed at the interface between the cement binder and the aggregate after compression tests. Therefore, an improved mixing procedure was adopted to improve the bondage between the cement/fly ash paste and the aggregate. The coarse aggregate was sieved and washed, and then was air-dried for use later. The additional amount of water was calculated to reach a saturated surface dry (SSD) condition of coarse aggregates. The "butter batch" was mixed in the rotating drum before mixing the pervious concrete. Then a small amount of cement/fly ash and GO suspension liquid (<5% by mass) was mixed with the aggregate for one minute to coat the surface of aggregate. Next, the remaining cement/fly ash, GO suspension liquid and water with admixtures were added to the rotating drum to mix for three minutes. The mixture was allowed to rest for three minutes, and then was mixed again for additional two minutes.

All 4 in.×8 in. cylinder specimens were prepared in two layers, with each layer compacted by ten blows of a standard 2.5 kg Protocol hammer. The specimens were struck-off at the top surface before covered with caps. The specimens were then demolded after 24 hours, cured according to ASTM C192. To ensure that a pervious concrete cylinder has smooth, parallel, uniform bearing surfaces to the applied axial load during compression testing, the cylinders were capped with a sulfur capping compound according to ASTM C617).

Experimental Tests and Results

Density and Void Ratio

ASTM C1754 was used to determine the density of hardened pervious concrete. The average length of the specimen was recorded to the nearest 0.25 mm (0.01 in.). Then, the average diameter of the specimen was recorded to the nearest 0.25 mm (0.01 in.) by averaging two diameters measured at right angles to each other about the midheight of the specimen. To measure the dry mass, the specimen was first dried in an oven at a temperature of 38° C. for 24 h. Then specimen was removed from oven to record the mass. Next the specimen was returned to the oven for 24 h and again determine the mass. Repeat these two steps until the difference between any two subsequent mass measures is less than 0.5%. The density of the hardened pervious concrete of different mix at 28-day was calculated by dividing dry mass of sample by it volume, the results are listed in Table 6.

TABLE 6

Density of hardened pervious concrete at 28-day (unit: Kg/m³)

|  | Cement | Cement + GO | Fly ash | Fly ash + GO |
| --- | --- | --- | --- | --- |
| Sample 1 | 1873.3 | 1857.5 | 1926.5 | 1965.7 |
| Sample 2 | 1897.6 | 1885.3 | 1896.2 | 1944.7 |
| Sample 3 | 1860.2 | 1803.2 | 1885.6 | 1990.4 |
| Sample 4 | 1900.2 | 1869.4 | 1912.3 | 1983.6 |
| Average | 1882.8 | 1853.9 | 1905.2 | 1971.1 |

ASTM C1754 was used to determine the void ratio of hardened pervious concrete. The void ratio of the hardened pervious concrete of difference mix at 28-day is listed in Table 7 by using Equation 1. All the samples have values of void ratio between 20% and 31%, which are within an acceptable range. The incorporation of GO into the binder shows that the average void ratio of fly ash pervious concrete decreased from 24.9% to 21.2%, whereas the average void ratio of Portland cement pervious concrete increased from 27.4% to 28.9%.

$$\text{Void ratio} = \left(1 - \frac{w_d - w_w}{\rho_w v}\right) \times 100\%$$ (Equation 1)

Where: $W_d$=oven dry mass of sample $W_w$=submerged mass of sample $\mu_w$=density of water v=volume of sample

TABLE 7

Void ratio of hardened pervious concrete at 28-day

|  | Cement | Cement + GO | Fly ash | Fly ash + GO |
| --- | --- | --- | --- | --- |
| Sample 1 | 27.8% | 29.3% | 23.2% | 21.5% |
| Sample 2 | 26.3% | 27.8% | 25.9% | 22.1% |
| Sample 3 | 28.3% | 30.8% | 25.5% | 20.2% |
| Sample 4 | 27.1% | 28.0% | 24.8% | 21.1% |
| Average | 27.4% | 28.9% | 24.9% | 21.2% |

Compressive and Split Tensile Strength Test

The compression test was performed on Day 7 and Day 28 following ASTM C39. Before testing, the diameter of each specimen was measured at the top, middle and bottom of specimen length. The cross-section area was calculated based on the average diameter. The loading rate used in this study was between 24 psi/sec and 40 psi/sec. The compressive strength ($f_c'$) of hardened pervious concrete from different mix design is listed in Table 8. All values in Table 8 are the average of three test results.

TABLE 8

Compressive strength results

| Mix design | 7-day $f_c'$ (psi) | 28-day $f_c'$ (psi) |
| --- | --- | --- |
| Cement | 1370 | 1820 |
| Cement + GO | 1380 | 2260 |
| Fly ash | 890 | 1450 |
| Fly ash + GO | 1460 | 2220 |

The addition of 0.03% (by weight of binder) GO improved the average 7-day $f_c'$ of fly ash pervious concrete significantly by 61% (from 890 psi to 1460 psi), while the 0.03% GO only increased the average 7-day $f_c'$ of cement pervious concrete from 1370 psi to 1380 psi (by 1%). The average 28-day $f_c'$ varied from 1450 psi to 2220 psi. The incorporation of 0.03% GO into the binder showed that the average 28-day $f_c'$ of fly ash pervious concrete was improved from 1450 psi to 2220 psi (by 53%), while the average 28-day $f_c'$ of cement pervious concrete was improved from 1820 psi to 2260 psi (by 24%).

In summary, the addition of 0.03% GO increased both 7-day and 28-day $f_c'$ of fly ash pervious concrete by more than 50%, while, for Portland cement pervious concrete, the 0.03% GO increased the 28-day compressive strength by 24% and had little effect on the early strength development. It was also noted that all samples produced from the improved mixing procedure described above, failed through the aggregate after compression tests, which eliminated the weak interface zone between the paste and aggregates.

A split tensile strength ($f_t'$) test was performed by applying a line load along cylinder length. Since there are no standard test methods for measuring the split tensile strength of pervious concrete, ASTM C496 was used in this study. Before testing, the diameter of each specimen was measured at the top, middle and bottom of specimen length. The cross-section area was calculated based on the average diameter. The loading rate for this test was between 100 psi/min and 150 psi/min. The split tensile strength of hardened pervious concrete was calculated based on Equation 2 and is listed in Table 9. All values in Table 9 are the average of three test results.

$$\text{Split tensile strength} = 2P/\pi ld \quad \text{(Equation 2)}$$

Where: P=maximum applied load
l=length
d=diameter

TABLE 9

Split tensile strength results

| Mix design | 7-day $f_t'$ (psi) | 28-day $f_t'$ (psi) |
|---|---|---|
| Cement | 170 | 245 |
| Cement + GO | 185 | 285 |
| Fly ash | 130 | 205 |
| Fly ash + GO | 185 | 275 |

The incorporation of 0.03% GO into the binder showed that the average 28-day $f_t'$ of fly ash pervious concrete was improved from 205 psi to 275 psi (by 34%), while the average 28-day $f_t'$ of cement pervious concrete was improved from 245 psi to 285 psi (by 16%). The split tensile strength is approximately equal to 12% of the compressive strength for all the pervious concrete mixes.

Young's Modulus

Young's modulus (E) is an important property used for the pervious concrete design. At the date of compressive strength tests, two samples of each mix design were used to determine the Young's modulus of pervious concrete according to ASTM C 469. Compressometer was used to measure the longitudinal strain of sample during the loading. The Young's modulus of the hardened pervious concrete was calculated based on Equation 3 and is listed in Table 10. All values in Table 10 are the average of two test results.

$$E = (S_2 - S_1)/(\varepsilon_2 - 0.000050) \quad \text{(Equation 3)}$$

Where: $S_2$=stress corresponding to 40% of ultimate load
$S_1$=stress corresponding to a longitudinal strain of 50 millionths
$\varepsilon_2$=longitudinal strain produce by stress $S_2$

TABLE 10

Young's modulus (E) of pervious concrete

| Mix design | E at 7-day (ksi) | E at 28-day (ksi) |
|---|---|---|
| Cement | 2450 | 2450 |
| Cement + GO | 2500 | 2550 |
| Fly ash | 2900 | 2950 |
| Fly ash + GO | 2950 | 3150 |

According to the test results, the fly ash pervious concrete has a higher E of 2950 ksi than that of cement pervious concrete (E=2450 ksi) at 28-day. At 28-day, the incorporation of 0.03% GO increased the E of the fly ash pervious concrete by 6.8% (from 2950 ksi to 3150 ksi), while it increased the E of the Portland cement pervious concrete by 4.1% (from 2450 ksi to 2550 ksi).

Infiltration Test

The test method proposed by Flores et al. J. ASTM Int, vol. 2, no. 1, p. 13, 2005, was adopted to evaluate the permeability of the pervious concrete. A 4×8 in (10×20 cm) pervious concrete cylinder was used in this method. The perimeter surface of cylinder was covered with a waterproof and non-absorbing material. A plastic cap was attached to the top of specimen to get a constant 1 cm water head at the top surface of pervious concrete. This test recorded the time that the given volume of water needs to flow through the entire specimen. The infiltration rate of the hardened pervious concrete was calculated based on Equation 4 and is listed in Table 11.

$$\text{Infiltration rate} = Q/At \quad \text{(Equation 4)}$$

Where: Q=volume of water for the test
A=cross-section area of specimen
t=recorded time for water to flow through the entire specimen

TABLE 11

Infiltration rate of hardened pervious concrete at 28-day

| | Cement (in/hr) | Cement + GO (in/hr) | Fly ash (in/hr) | Fly ash + GO (in/hr) |
|---|---|---|---|---|
| Sample 1 | 1249 | 1590 | 623 | 729 |
| Sample 2 | 1166 | 1521 | 583 | 795 |
| Sample 3 | 1093 | 2082 | 950 | 625 |
| Sample 4 | 1561 | 1682 | 776 | 515 |
| Average | 1267 | 1719 | 733 | 666 |

For all mixes, the infiltration rate ranges from 515 in/hr to 2082 in/hr. Low infiltration mixes are those with the fly ash as a binder. The Portland cement pervious concrete has a higher infiltration rate comparing with fly ash groups. It is likely that the fly ash pervious concrete needs more volume of binder, which yields a less void and tortuous structure, to achieve the similar strength of the cement pervious concrete. While the GO reduced the infiltration rate of the fly ash pervious concrete, it significantly improved the infiltration rate of the Portland cement pervious concrete. Further investigation is needed to understand the effects of GO on the void ratio and permeability of the pervious concrete.

Freeze-Deicer Salt Scaling Resistance Test

During this test, the pervious concrete cylinders at 28-day were immersed into a plastic container containing 3% NaCl solution for 24 h. Then the concrete cylinders were surface-dried with paper towels and weighed. Next, all the cylinders were placed back into a closed container and transferred with solution into the freezer at −20±1° C. for 24 h. After this freezing stage, the specimens were placed in the laboratory environment at 23±2° C. and with a RH ranging from 45 to 55% for 12 h. Once the ice in the plastic container was completely thawed, the cylinders was transferred onto a wood plate and dried for 12 hours, at which time each of the specimens was weighed and their mass was recorded. This freeze/thaw and wet/dry cycle was repeated 15 times. The mass change of each concrete cylinder was tested. By design, this test protocol simulates the salt scaling of the field concrete in an accelerated manner.

The test results are presented in FIG. 1. After the 3' cycle, the cement pervious concrete had a weight loss of 2.1% and 5.4%, whereas the fly ash pervious concrete had a weight loss of approximately 15%. The initial weight loss of fly ash pervious concrete is higher, since there was still a certain amount of the unhydrated fly ash binder at 28-day. Due to the slow hydration progress, the fly ash pervious concrete typically performs more strongly at later ages. The incorporation of GO increased the salt scaling resistance for all groups. Although the ordinary fly ash pervious concrete didn't show a better salt scaling resistance than other groups, it is noteworthy that the GO modified fly ash pervious concrete is the only group survived after 5th cycle with 57% weight loss, which indicates that GO modified hydration products from the fly ash have a better salt scaling resistance than the conventional cement hydrates.

An environmentally friendly pervious concrete mix design of a pure fly ash binder modified by graphene oxide (GO) is disclosed herein and in comparison with control groups, all hardened pervious concrete samples have a density ranging from 1803 Kg/m3 to 1990 Kg/m3, while the fly ash pervious concrete typically has a greater density than the cement pervious concrete. All the samples have values of void ratio between 20% and 31%. By incorporating GO into the binder, the average void ratio of fly ash pervious concrete was reduced, whereas the average void ratio of Portland cement pervious concrete was increased.

The average 28-day fc' for fly ash pervious concrete is 1450 psi, and 2260 psi for GO modified fly ash pervious concrete. The addition of 0.03% GO (by weight of binder) increased both 7-day and 28-day fc' of fly ash pervious concrete by more than 50%, while, for Portland cement pervious concrete, the 0.03% GO increased the 28-day fc' by 24% and had little effect on the early strength development.

The average 28-day ft' for the fly ash pervious concrete is 205 psi, and 275 psi for GO modified fly ash pervious concrete. The incorporation of 0.03% GO (by weight of binder) into the binder showed that the average 28-day ft' of fly ash pervious concrete was improved by 34%, while the average 28-day ft' of cement pervious concrete was improved by 16%. The split tensile strength is approximately equal to 12% of the compressive strength for all the pervious concrete mixes at 28-day.

The fly ash pervious concrete has a higher E of 2950 ksi than that of Portland cement pervious concrete (E=2450 ksi) at 28-day. At 28-day, the incorporation of 0.03% GO increased the E of the fly ash pervious concrete by 6.8%, while it increased the E of the Portland cement pervious concrete by 4.1%.

For all mixes, the infiltration rate ranges from 515 in/hr to 2082 in/hr. The Portland cement pervious concrete has a higher infiltration rate than fly ash groups. While the GO reduced the infiltration rate of the fly ash pervious concrete, it significantly improved the infiltration rate of the Portland cement pervious concrete. The infiltration rate was also found to increase exponentially as a function of void ratio.

The freeze-deicer salt scaling resistance test was conducted at 28-day; the initial weight loss of fly ash pervious concrete is much higher than that of cement pervious concrete due to the slow hydration of fly ashes. The incorporation of GO increased the salt scaling resistance for all groups, but the improvement for the fly ash pervious concrete is marginal. the GO modified fly ash pervious concrete is the only group survived after $5^{th}$ cycle, which indicates that GO modified hydration products from the fly ash have a better salt scaling resistance than the conventional cement hydrates.

It is concluded that the GO modified fly ash pervious concrete developed in this study is comparable to the ordinary cement pervious concrete with the desirable density, void ratio, strength and infiltration rate. However, the freeze-deicer salt scaling resistance of fly ash pervious concrete at early ages is not as good as ordinary cement pervious concrete due to its relatively high initial loss. Further investigation is needed to improve its hydration degree at early ages.

Example 2

Materials

Three types of fly ash used in this study were obtained from three western U.S. power plants. Fly ash compositions were examined by X-ray fluorescence (XRF) analysis and are presented in Table 12. CFA 1 can be considered as a low-reactive fly ash, whereas CFA3 is high-reactive.

TABLE 12

| Chemical composition of the fly ash (% wt.) | | | | | | | | | | | |
|---|---|---|---|---|---|---|---|---|---|---|---|
| | Si02 | Alz03 | Fe203 | Na20 | KzO | Ti02 | MgO | Cao | MnO | L.O.I* | Origin |
| CFA 1 | 23.5 | 13.8 | 4.8 | 6.3 | 0.4 | 1.3 | 4.2 | 23.2 | 0.1 | 0.15 | OR |
| FFA 2 | 33.3 | 14.9 | 5.4 | 3.7 | 1.2 | 1.1 | 4.7 | 14.5 | 0.1 | 1.8 | WA |
| CFA 3 | 20.6 | 14.5 | 4.7 | 2.5 | 0.3 | 1.4 | 6.2 | 29.9 | 0.1 | 0.32 | MT |

*Loss on ignition

Two groups of additives were selected based upon comprehensive literature review to mix with fly ash to develop an environmental friendly CFA binder.

Group 1: Additives to improve binder's workability, strength and durability.
  Nanoclay was selected to improve compressive and tensile strength
  SBR latex was used to decrease chloride permeability.
  Borax was used mainly as a set retarder to prohibit flash setting
  High-range Water reducer to improve workability
  Air-entraining (AE) agent to improve durability and workability
  Triethanolamine (TEA) to improve early strength Group 2: Additives to serve as chemical activators, which facilitate fly ash dissolution and polymerization of hydration products,
  Sodium Silicate ($Na_2SiO_3.9H_2O$)
  Sodium Sulfate ($Na_2SO_4.10H_2O$)
  Quicklime (CaO)
  Calcium Chloride ($CaCl_2.2H_2O$)

Sand, complying with ASTM C144 standard, was used to mix with the fly ash binder and water for testing later.

Testing Methods

For evaluating the fly ash binder, mortar samples made from CFA binder were tested with the use of hydraulic compression test machine. According to ASTM C270 & C780 standards, CFA was mixed with sand, water and the additives mentioned above. The ratio of binder/sand is 1:2.5 by volume. In order to achieve reasonable workability and mechanical strength, the water/binder ratio was determined at 0.2-0.32 based on extensive trial and error. After mixing, mortar was cast into 2×4 in cylinder mold for 24 hrs, and then mortar cylinders were demolded and cured in the controlled environment (temperature=18° C.-22° C., relative humidity=98%). Compressive strength were tested on 3-day, 7-day, 14-day and 28-day following ASTM C109 & C496 standards, which provided an indication of cementing ability of CFA binder from the macro perspective.

In an effort to make CFA binder suitable for self-compacting concrete (SCC), Mini slump flow test was adopted to examine the mortar flow capacity. It gives slump flow value by measuring the average of final spread diameter of the mortar under self-weight. The amount of water reducer was adjusted so that the final spread diameter could achieve min 200 mm (8 inch).

According to AAHTO TP 95, Surface resistivity test was conducted for electrical indication of CFA binder's ability to resist chloride ion penetration, which is an important aspect of durability.

To examine the CFA binder at micro-level, Scanning Electron Microscopy (SEM) and was carried out to retrieve sample's information about surface morphology, amorphous and crystalline structure.

Design of Experiment (DoE)

Uniform Design (UD) scheme was adopted to design experiments to investigate the effects of Group 1 & 2 additives on compressive strength of CFA mortar. The UD is a design such that the experimental points are uniformly scattered in the domain of experiments. These experimental points are called good lattice points, which are representative for the domain. Compared with orthogonal factorial design (OFD), UD can reduce the number of experiments significantly when dealing with a large number of parameters at different levels. The amount of additives used in Table 13 was determined based upon comprehensive literature review, cost consideration and extensive trial and error.

TABLE 13

DoE factors and levels for Group 1 & 2 additives

| DoE 1 Factors | Nanoclay/CFAI ratio XI | SBR/CFA I ratio X2 | FFA2/CFAI ratio X3 | Water/Binder ratio X4 | Air-entraining agent dosage X5 |
|---|---|---|---|---|---|
| Level 1 | 0% | 0% | 0% | 20% | 0 ml/kg |
| Level 2 | 0.6% | 6% | 10% | 22% | 25 ml/kg |
| Level 3 | 1.2% | 12% | 20% | 24% | 50 ml/kg |

| DoE 2 Factors | Na2SiQ3/CFAI ratio XI | CaO/CFAI ratio X2 | CaCh/CFAI ratio X3 | Na2SO4/CFA I Ratio X4 | Water/Binder ratio X5 |
|---|---|---|---|---|---|
| Level 1 | 1% | 2% | 0.5% | 1% | 28% |
| Level 2 | 3% | 5% | 1% | 2% | 30% |
| Level 3 | 7% | 10% | 2% | 3% | 32% |

*Borax dosage = 0.2 wt. % of binder, TEA dosage = 1.2 ml/l for all DoE 1 & 2 mortars
*Water reducer dosage is adjusted to reach desirable spread diameter
*Ratio in wt. %

DoE 1 is designed for Group 1 additives. Five factors were investigated at 3 levels as indicated in the Table 2. Total 27 groups of moliar were prepared with each factor at different levels. Five factors were investigated at 3 levels as indicated in Table 13. Another 27 groups of mortar were prepared with each factor at different levels. Responses from all 54 groups were recorded; an algebraic function of factors was developed to characterize the response. The function of factors will allow predicting the response at intermediate levels, which are not experimentally studied. The user could optimize the function of factors subject to constrain on the others, such as determining the lowest cost CFA binder with strength greater than the designed strength.

Results and Discussions

Environmental Friendly CFA Mortars without Activation (Group 1 Additives)

The average values for 3-day, 7-day, 14-day, 28-day compressive strength and spread diameter are presented in Table 14, along with the water reducer dosage (ml/one-liter water). The surface resistivity of samples was recorded as well. The amount of water reducer was adjusted so that the final spread diameter could achieve 8 inch, since it is considered to be an important property of SCC. All fly ash moliar samples showed surface resistivity between 104 and 241 kΩ-cm, which can be categorized into a very low chloride permeability group according to AASHTO TS9, which attributes low permeability to lower conductivity of hydration products, lower amount of ions in the pore solution and lower porosity.

TABLE 14

DoE 1: Prope lies of fresh and hardened mortar with Group 1 additives

| Run | 3-day fc' (psi) | 7-day fc' (psi) | 14-day fc' (psi) | 28-day fc' {psi} | Spread Diameter (in) | Water Reduce (ml/I) | Surface Resistivity kQ-cm (28-d) |
|---|---|---|---|---|---|---|---|
| 1 | 1177.6 | 1554.0 | 1840.2 | 2191.8 | 9.4 | 15 | 170 |
| 2 | 720.6 | 1018.5 | 1228.5 | 1443.8 | 9.3 | 15 | 161 |
| 3 | 242.9 | 383.25 | 490.9 | 528 | 9.0 | 20 | 208 |
| 4 | 490.0 | 913.5 | 1000.2 | 1102.5 | 9.1 | 15 | 191 |
| 5 | 494.1 | 682.5 | 774.4 | 1021.2 | 9.2 | 20 | 241 |
| 6 | 286.2 | 480.4 | 535.5 | 603.8 | 8.9 | 20 | 232 |
| 7 | 586.8 | 879.4 | 1147.2 | 1317.8 | 9.2 | 15 | 157 |
| 8 | 1459.7 | 2155.8 | 2459.6 | 2690.6 | 9.4 | 20 | 142 |

TABLE 14-continued

DoE 1: Prope lies of fresh and hardened mortar with Group 1 additives

| Run | 3-day fc' (psi) | 7-day fc' (psi) | 14-day fc' (psi) | 28-day fc' {psi} | Spread Diameter (in) | Water Reduce (ml/I) | Surface Resistivity kQ-cm (28-d) |
|---|---|---|---|---|---|---|---|
| 9 | 557.9 | 1102.5 | 1231.4 | 1333.5 | 11.2 | 15 | 130 |
| 10 | 660.9 | 1084.2 | 1215.4 | 1370.4 | 12.3 | 15 | 124 |
| 11 | 1338.2 | 1842.8 | 2173.5 | 2226.0 | 10.0 | 10 | 119 |
| 12 | 1393.8 | 2073.8 | 2307.4 | 2583.0 | 8.8 | 15 | 152 |
| 13 | 312.9 | 540.8 | 624.8 | 727.2 | 11.6 | 20 | 210 |
| 14 | 475.6 | 674.7 | 714 | 876.8 | 8.8 | 25 | 180 |
| 15 | 405.6 | 614.3 | 708.8 | 790.2 | 9.3 | 15 | 143 |
| 16 | 821.5 | 1286.3 | 1393.9 | 1580.3 | 12.0 | 10 | 120 |
| 17 | 531.2 | 787.5 | 863.7 | 1055.3 | 9.4 | 20 | 192 |
| 18 | 255.3 | 443.7 | 506.7 | 556.5 | 9.0 | 20 | 142 |
| 19 | 903.8 | 1304.6 | 1601.3 | 1840.2 | 11.9 | 10 | 113 |

TABLE 14-continued

DoE 1: Properies of fresh and hardened mortar with Group 1 additives

| Run | 3-day fc' (psi) | 7-day fc' (psi) | 14-day fc' (psi) | 28-day fc' {psi} | Spread Diameter (in) | Water Reduce (ml/I) | Surface Resistivity kQ-cm (28-d) |
|---|---|---|---|---|---|---|---|
| 20 | 331.5 | 595.9 | 656.3 | 753.4 | 8.7 | 20 | 109 |
| 21 | 236.8 | 380.7 | 391.2 | 420.0 | 8.9 | 20 | 177 |
| 22 | 1566.8 | 2325.8 | 2682.8 | 2974.9 | 12.6 | 10 | 142 |
| 23 | 1420.6 | 2084.3 | 2438.6 | 2651 | 11.3 | 15 | 109 |
| 24 | 280.0 | 477.8 | 506.7 | 532.9 | 9.1 | 20 | 175 |
| 25 | 957.4 | 1312.5 | 1452.4 | 1557.4 | 10.2 | 15 | 192 |
| 26 | 932.6 | 1580.3 | 1724.6 | 1916.3 | 11.4 | 15 | 117 |
| 27 | 1027.4 | 1585.5 | 1737.8 | 1785.0 | 11.9 | 10 | 104 |

Model Derivation and Visualization

By conducting the regression analysis, data in Table 14 was used to develop compressive strength models for DoE 1 with Group 1 additive. For simplicity, all factors in the model were standardized to a value from −1 to 1. 3-day, 7-day, 14-day and 28-day compressive strength models were developed as following:

$$fc'(3\text{-day})=938.7-474.2*X2-116.9*X4-201.8*Xfl''2-153.9*X3X5$$

$$fc'(7\text{-day})=1102.2-641*X2145.8*X4-146*X1''2+166.4*X3''2+162.8*X2X4$$

$$fc'(14\text{-day})=1291.6-738*X2-169.8*X4-204.6*X1''2+117.2*X3''2+177.5*X2X4$$

$$fc'(28\text{-day})=1552.6-834*X2-210.8*X4-292.5*X1''2+218.9*X3''2+192*X2X4$$

Since all compressive models show a two-way interaction, three-dimensional (3D) Contour plots were provided to show the response surface, which help to identify the type of interactions between the test variables. The predicted results showed a good correlation with test results.

Environmental Friendly Pure Fly Ash (EFPF) Mortars with Activation (Group 2 Additives)

Similar to DoE 1, the average values for 7-day, 14-day, 28-day compressive strength and spread diameter are shown in Table 15, along with the water reducer dosage and surface resistivity of all samples. All fly ash mortar samples showed surface resistivity between 117 and 1571 kΩ-cm, which can be categorized into a very low chloride permeability group as well. However the variance of surface resistivity in DoE I is more than that of DoE 2. This may be attributable to the Group 1 additives.

TABLE 15

DoE 2: Properties of fresh and hardened mortar with Group 2 additives

| Run | 7-day fc' (psi) | 14-day fc' (psi) | 28-day fc' (psi) | Spread Diameter (in) | Water Reduce (ml/I) | Surface Resistivity kQ-cm (28-d) |
|---|---|---|---|---|---|---|
| 1 | 2014.7 | 2532.2 | 2787.2 | 10.3 | 10 | 142 |
| 2 | 2312.4 | 2769.2 | 2988.3 | 9.8 | 20 | 151 |
| 3 | 2562.4 | 2766.3 | 3212.1 | 9.9 | 20 | 154 |
| 4 | 2187.0 | 2988.1 | 34673 | 9.6 | 20 | 155 |
| 5 | 2588.2 | 3199.0 | 3756.7 | 9.7 | 10 | 139 |
| 6 | 2185.9 | 2727.8 | 3112.3 | 8.9 | 5 | 146 |
| 7 | 2395.2 | 2877.1 | 3289.0 | 10.7 | 20 | 150 |
| 8 | 2380.2 | 2988.2 | 3522.5 | 10.3 | 20 | 142 |
| 9 | 2609.4 | 3289.2 | 3876.2 | 9.1 | 25 | 130 |
| 10 | 1910.6 | 2756.5 | 3100.2 | 10.0 | 10 | 133 |
| 11 | 2162.6 | 2256.2 | 2431.9 | 9.2 | 15 | 152 |
| 12 | 2563.3 | 3302.0 | 3771.1 | 9.8 | 25 | 139 |
| 13 | 1867.5 | 2729.4 | 3087.0 | 9.6 | 5 | 149 |
| 14 | 2407.1 | 2987.1 | 3652.1 | 9.7 | 10 | 140 |
| 15 | 2807.1 | 3421.2 | 3987.6 | 10.0 | 10 | 143 |
| 16 | 2797.7 | 3102.1 | 3566.4 | 9.4 | 20 | 120 |
| 17 | 2117.7 | 3212.0 | 3411.2 | 9.8 | 25 | 139 |
| 18 | 2352.9 | 3388.3 | 3762.0 | 9.9 | 15 | 142 |
| 19 | 2383.5 | 3554.9 | 4011.7 | 9.4 | 20 | 123 |
| 20 | 2557.7 | 3411.8 | 4156.4 | 9.7 | 5 | 119 |
| 21 | 2357.7 | 2998.0 | 3456.3 | 9.3 | 5 | 157 |
| 22 | 2376.5 | 3400.1 | 4231.2 | 10.6 | 20 | 142 |
| 23 | 2705.9 | 3721.1 | 4877.9 | 11.0 | 20 | 119 |
| 24 | 2658.8 | 4010.4 | 4412.0 | 9.9 | 5 | 145 |
| 25 | 2235.3 | 2612.2 | 2766.6 | 9.7 | 15 | 142 |
| 26 | 1882.4 | 2488.8 | 2988.3 | 10.2 | 15 | 117 |
| 27 | 2009.4 | 2780.3 | 3277.0 | 9.3 | 20 | 124 |

Model Derivation and Visualization

By using the regression analysis, data in Table 15 was used to develop compressive strength models for DoE 2 with Group 2 additive. All factors in the model were standardized to a value from −1 to 1 as well. 7-day, 14-day and 28-day compressive strength models were developed by running regression analyses.

3.3 Effects of Group 1 Additives

Figure 2A:
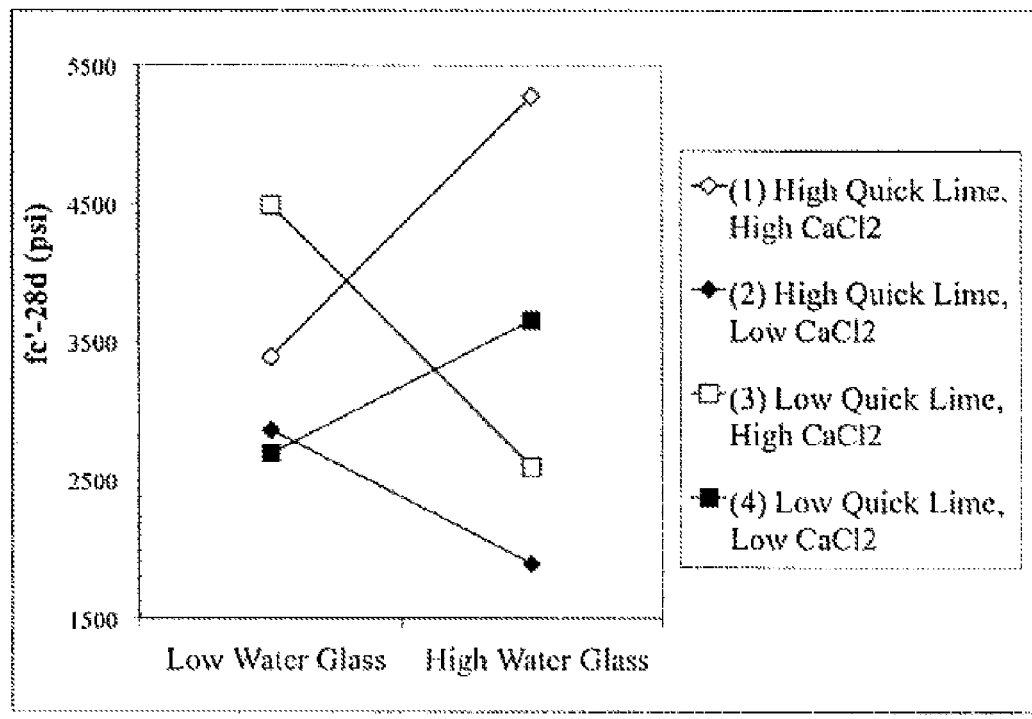
FIGS. 2A and 2B are trace plots for (FIG. 2A) 3-day $f_c'$ model.
Figure 2B:
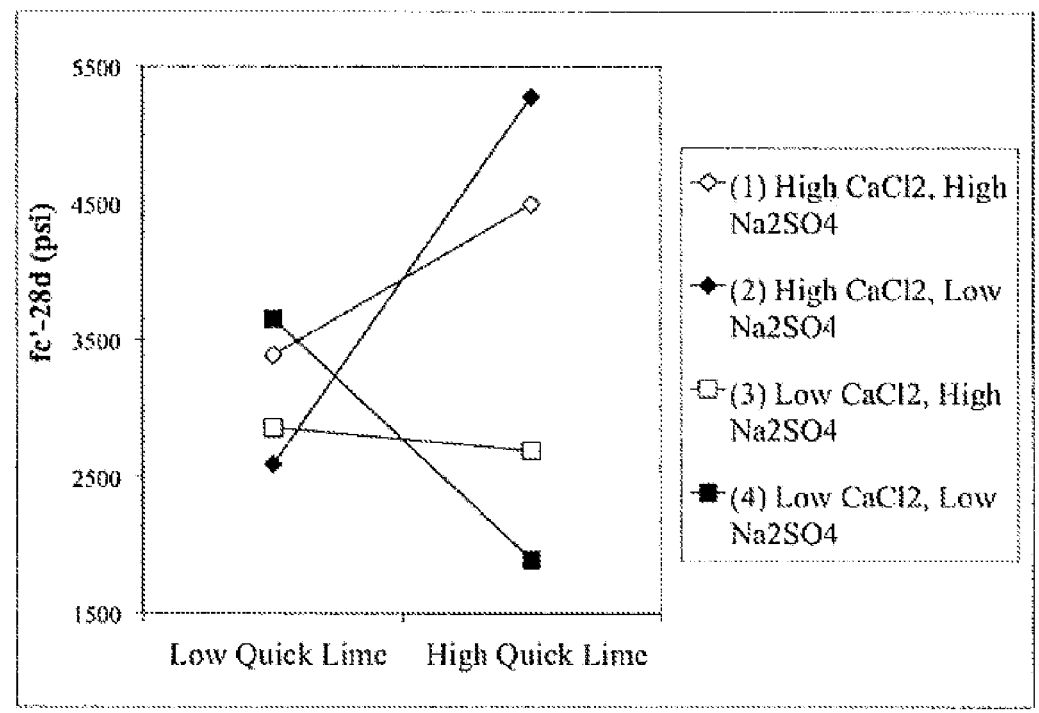

Trace charts, showing the effect of changing each mixture component while holding all other components in a constant ratio, are presented in FIGS. 2A and 2B. The reference design in the figure is the centroid of the experimental design.

As shown in FIGS. 2A and 2B, SBR latex had the negative effect on the compressive strength. Both 3-day and 28 day fc' decreased significantly as SBR latex content increased. However, Table 14 shows that runs with more SBR latex content demonstrated higher surface resistivity, which indicates lower chloride permeability. This observation indicates that SBR latex altered the morphology and microstructure of the hardened mortar. The compressive strength decreased as water/binder ratio increased. However the slope is not as steep as that of SBR latex. Trace plots of both Nanoclay and FFA2 showed a parabolic nature. The curvature of these two variables is relatively small, showing a relatively low sensitivity of response. However, small amount of Nanoclay (0.6% of CF Al) improved the compressive strength by approximate 15%.

3.4 Effects of Group 2 Additives

Figure 3A:
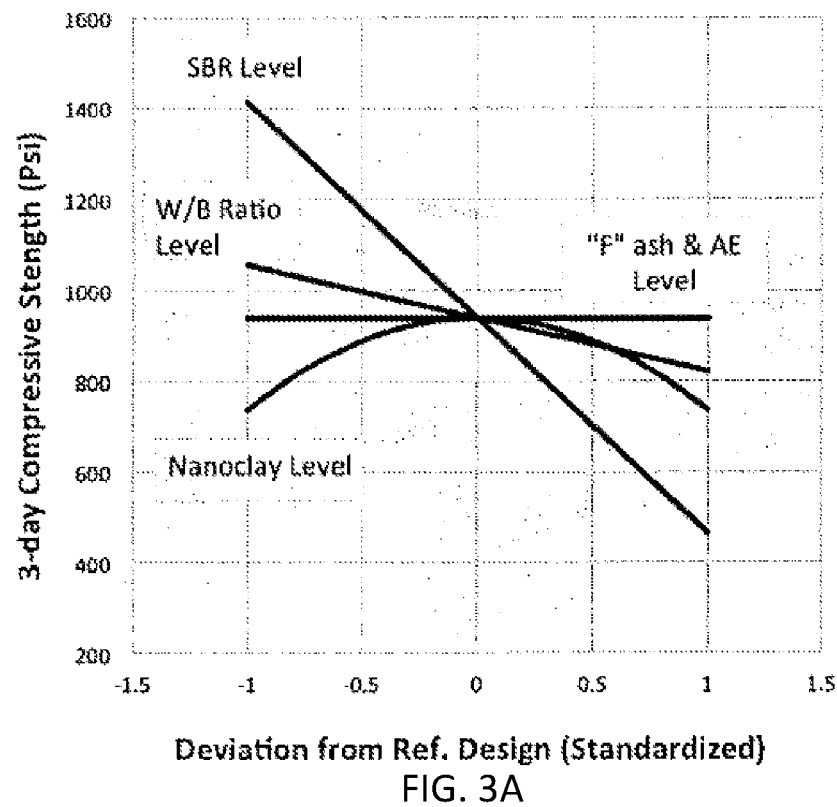
FIG. 3A is a graph showing the synergistic effect of quicklime, $CaCl_2$ and water glass in 28-day $f_c'$ model (factor X1, X2 and X3).
Figure 3B:
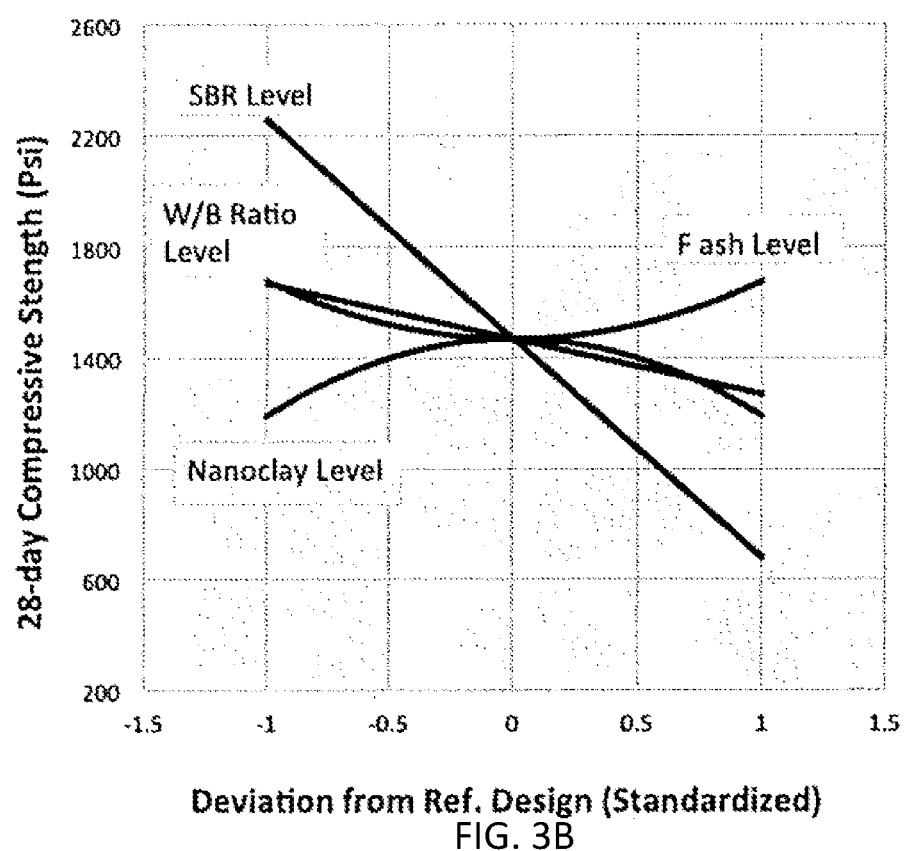
FIG. 3B is a graph showing the synergistic effect of quicklime, $CaCl_2$ and $Na_2SO_4$ in 28-day $f_c'$ model (factor X2, X3 and X4).
Figure 4A:
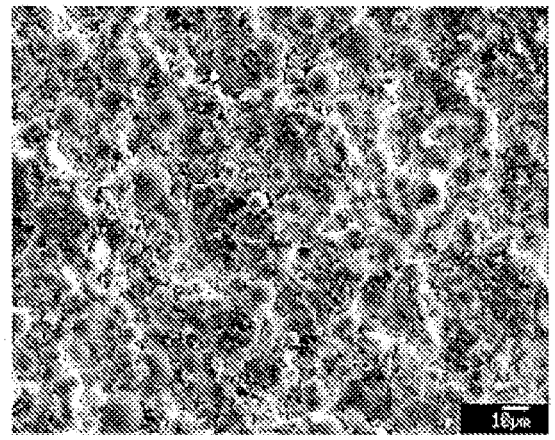
FIGS. 4A-4F are SEM micrographs of a mortar surface at 28 days.
Figure 4B:
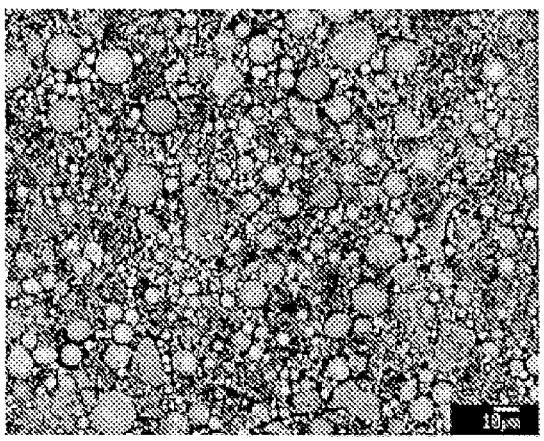
Figure 4C:
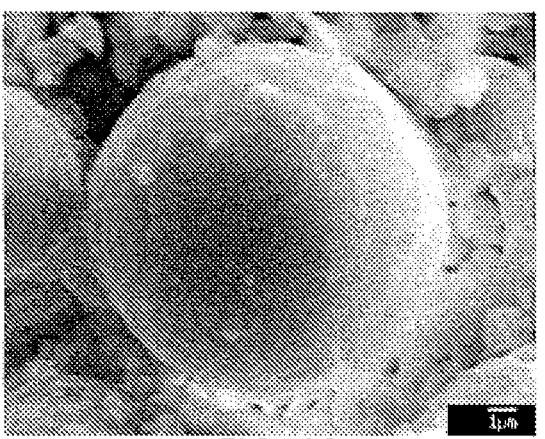
Figure 4D:
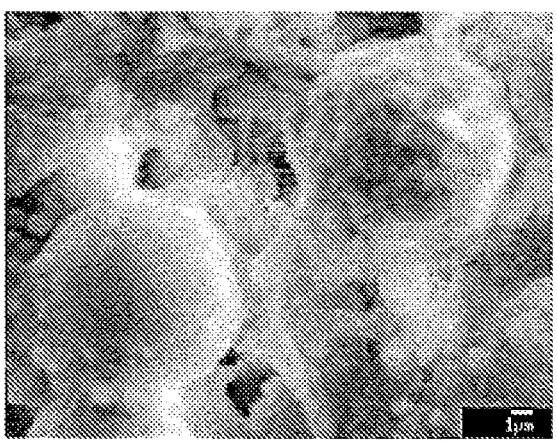
Figure 4E:
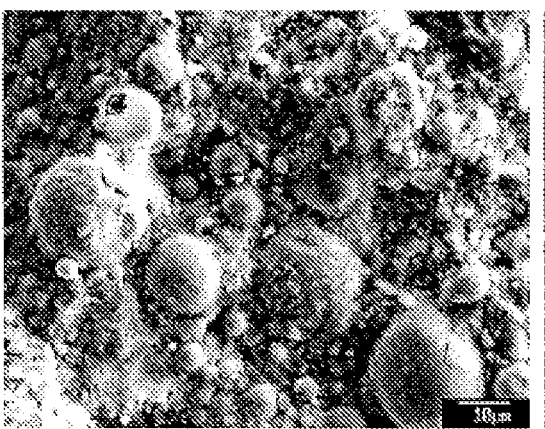
Figure 4F:
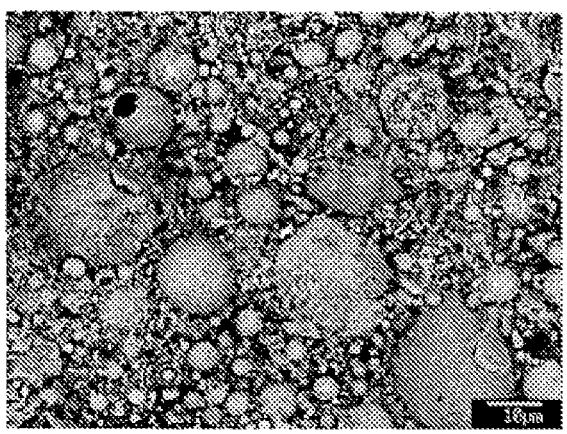

Three-way interaction charts (FIGS. 3A and 3B) can provide some information about the influence of Group 2 additives. To better understand the effects of these chemical activators, SEM analysis was carried out. Since Run 22 of DoE 1 is the best performer in terms of compressive strength development, SEM micrograph of mortar surface for Run 22 at 28 days was taken. As shown in the FIG. 4A, most of fly ash spheres remained intact, which indicates that the degree of fly ash hydration was relatively low. FIG. 4D further shows that fly ash spheres were covered by hydration products and some interlacing fibrous structures were formed among spheres. It is reasonable to assume that these fibrous structures provided the mechanic strength. However, FIG. 4C shows that hydration only occurred at the surface layer of spheres. Although fly ash sphere is considered to be a principal source of aluminosilicates, low-reactive CFA spheres are only able to provide a thin layer of hydration products without activation. These identified interlacing fibrous structures may be formed from other limited sources of hydration precursors in fly ash, such as $C_3A$, $C_4AF$ or kleinite. Without activation, low-reactive CFA1 only developed a compressive strength of 3000 psi at 28 days, whereas high-reactive CFA3 (control group) developed a compressive strength of 5300 psi at 28 days.

SEM micrograph of the best performer of DoE 2, Run 23, was given in FIG. 7E. The surface morphology of Run 23 of DoE 2 clearly shows that most of fly ash spheres were dissolved with Group 2 additives and formed amorphous gel structures. The interlacing fibrous structures identified in DoE 1 were absent. It is reasonable to assume that these amorphous gel structures provided the mechanic strength. Since the dissolution of spheres is improved significantly with chemical activation, more aluminosilicates are provided to form gel structure, the compressive strength of Run 15 of DoE 2 reached approximate 5000 psi at 28-day.

Back-scattered Electron (BSE) images were taken for two best performers from DoE 1 & 2 as well. Since sample composition determines BSE image contrast, these images can provide a better comparison of fly ash reactivity. FIG. 7B was taken from the same area of FIG. 7A for Run 22 of DoE 1; it further confirms that most of fly ash spheres remain intact without chemical activation, which mainly served as micro-aggregates in the DoEJ. FIG. 7F was taken from the same area of FIG. 7E for Run 23 of DoE 2; it provides a better view of dissolution of fly ash spheres with chemical activation. Fly ash spheres in FIG. 7F clearly show different levels of dissolution: some spheres were totally dissolved, some spheres collapsed, whereas some were only at the onset of dissolution.

CONCLUSION

With Group 1 additives, a low-reactive CFA was able to form a mortar with a 28-d compressive strength of 3000 psi. SBR latex was able to improve the surface resistivity by altering the morphology and microstructure of the hardened mortar. However, SBR latex had a negative effect on the compressive strength. Small addition of Nanoclay (0.6% of CF A) improved the compressive strength of CFA mortar by 15%. On the contrary, addition of FFA2 decreased the mortar compressive strength when it's lower than 20% of CFA.

With Group 2 additives, the low-reactive CF A was able to form a mortar with a 28-d compressive strength of 5000 psi. Sodium silicate, sodium sulfate, quicklime and calcium chloride, serving as chemical activators to improve the CF A dissolution and polymerization, were very effective to improve the 28-d compressive strength from 3000 psi to 5000 psi. Also these activators showed a high level of synergetic effect.

In view of the many possible embodiments to which the principles of the disclosed invention may be applied, it should be recognized that the illustrated embodiments are only preferred examples of the invention and should not be taken as limiting the scope of the invention.

What is claimed is:
1. A composition comprising:
 (a) fly ash cementitious binder;
 (b) at least one of sodium silicate activator or potassium silicate activator;
 (c) at least one of sodium sulfate activator, potassium sulfate activator, calcium sulfate activator, sodium phosphate activator, or potassium phosphate activator;
 (d) at least one of CaO activator, $Fe_2O_3$ activator, fine fraction of concrete waste from construction or demolition activator; and
 (e) at least one of calcium chloride activator or sodium chloride activator,
 wherein the fly ash is the only cementitious binder present in the composition and the CaO activator, if present, is present in an amount of ≤10 weight percent, based on the total dry weight of the composition.

2. The composition of claim 1, wherein the fly ash comprises greater than 10 weight percent CaO, based on the total dry weight of the fly ash.

3. The composition of claim 1, wherein the fly ash comprises less than 25 weight percent CaO, and has a weight ratio of $Al_2O_3/(Al_2O_3+SiO_2)$ of at least 0.40, based on the total dry weight of the fly ash.

4. The composition of claim 1, further comprising graphene oxide, multiwall carbon nanotubes, or a combination thereof.

5. The composition of claim 4, wherein the graphene oxide or multiwall carbon nanotubes is present in an amount of 0.030 weight percent, based on the total dry weight of the composition.

6. The composition of claim 4, wherein the graphene oxide or multiwall carbon nanotubes is present in an amount of 0.01 to 0.10 weight percent, based on the total dry weight of the composition.

7. The composition of claim 1, wherein the composition includes 7 weight percent sodium silicate activator, 1 weight percent sodium sulfate activator, 5 weight percent CaO activator, and 1 weight percent calcium chloride activator, based on the weight of the fly ash.

8. The composition of claim 1, wherein the composition includes 1 to 7 weight percent sodium silicate or potassium silicate activator, 1 to 3 weight percent sodium sulfate, potassium sulfate, calcium sulfate, sodium phosphate or potassium phosphate activator, 2 to 10 weight percent CaO or fine fraction of concrete waste from construction or demolition activator, based on the weight of the fly ash.

9. The composition of claim 1, wherein the fly ash is a Class F or Class C fly ash.

10. The composition of claim 1, wherein the composition includes sodium silicate, sodium sulfate, CaO, and calcium chloride.

11. The composition of claim 1, further comprising graphene oxide.

12. The composition of claim 11, wherein the graphene oxide is present in an amount of 0.030 weight percent, based on the total dry weight of the composition.

13. The composition of claim 10, wherein the composition includes 1 to 7 weight percent sodium silicate activator, 1 to 3 weight percent sodium sulfate activator, 2 to 10 weight percent CaO activator, and 0.5 to 2 weight percent calcium chloride activator, based on the weight of the fly ash.

14. The composition of claim 10, wherein the fly ash is a Class C fly ash.

15. The composition of claim 1, wherein the composition further comprises at least one aggregate.

16. The composition of claim 1, wherein the composition is in the form of a cementitious paste without any aggregate.

17. The composition of claim 1, wherein the $Fe_2O_3$ activator, if present, is present in an amount of ≤2 weight percent, based on the total dry weight of the composition.

18. A composition comprising:
 (a) fly ash cementitious binder, wherein the fly ash comprises greater than 10 weight percent CaO, based on the total dry weight of the fly ash; and (b) graphene oxide in an amount of 0.01 to 0.10 weight percent, based on the total dry weight of the composition, wherein the fly ash is the only cementitious binder present in the composition.

19. The composition of claim 18, wherein the fly ash comprises less than 25 weight percent CaO, and has a weight ratio of $Al_2O_3/(Al_2O_3+SiO_2)$ of at least 0.40, based on the total dry weight of the fly ash.

20. The composition of claim 18, wherein the composition further comprises a chemical activator selected from sodium silicate, potassium silicate, sodium sulfate, sodium phosphate, calcium sulfate, potassium sulfate, potassium phosphate, CaO, $Fe_2O_3$, sodium chloride, calcium chloride, fine fraction of concrete waste from construction or demolition, cement kiln dust, or a combination thereof.

21. The composition of claim 18, wherein the composition further comprises a chemical activator selected from sodium silicate, sodium sulfate, CaO, calcium chloride, or a combination thereof.

22. The composition of claim 18, wherein the graphene oxide is present in an amount of 0.030 weight percent, based on the total dry weight of the composition.

23. The composition of claim 18, wherein the composition includes 7 weight percent sodium silicate activator, 1 weight percent sodium sulfate activator, 5 weight percent CaO activator, and 1 weight percent calcium chloride activator, based on the weight of the fly ash.

24. The composition of claim 18, wherein the composition includes 1 to 7 weight percent sodium silicate activator, 1 to 3 weight percent sodium sulfate activator, 2 to 10 weight percent CaO activator, and 0.5 to 1 weight percent calcium chloride activator, based on the weight of the fly ash.

25. The composition of claim 18, wherein the fly ash is a Class C fly ash.

26. The composition of claim 18, wherein the composition further comprises at least one aggregate.

27. The composition of claim 18, wherein the composition is in the form of a cementitious paste without any aggregate.

28. A method comprising:
 (i) forming a mixture of (a) fly ash cementitious binder; (b) at least one of sodium silicate activator or potassium silicate activator; (c) at least one of sodium sulfate activator, potassium sulfate activator, calcium sulfate activator, sodium phosphate activator, or potassium phosphate activator; (d) at least one of CaO activator, $Fe_2O_3$ activator, fine fraction of concrete waste from construction or demolition activator; and (e) at least one of calcium chloride or sodium chloride activator, wherein the fly ash is the only cementitious binder present in the composition and the CaO activator, if present, is present in an amount of ≤10 weight percent, based on the total dry weight of the composition; and
 (ii) curing the mixture at ambient temperature and ambient pressure.

29. The method of claim 28, wherein the curing comprises adding water to the mixture (i).

30. A method comprising:
 (i) forming a mixture of (a) fly ash cementitious binder, wherein the fly ash comprises greater than 10 weight percent CaO, based on the total dry weight of the fly ash and (b) graphene oxide in an amount of 0.01 to 0.10 weight percent, based on the total dry weight of the composition, wherein the fly ash is the only cementitious binder present in the composition; and
 (ii) curing the mixture at ambient temperature and ambient pressure.

31. The method of claim 30, wherein the curing comprises adding water to the mixture (i).

32. A composition comprising:
 (a) a Class C fly ash cementitious binder;
 (b) a chemical activator consisting of sodium silicate, potassium silicate, sodium sulfate, sodium phosphate, calcium sulfate, potassium sulfate, potassium phosphate, CaO, $Fe_2O_3$, sodium chloride, calcium chloride, fine fraction of concrete waste from construction or demolition, cement kiln dust, or a combination thereof; and
 (c) graphene oxide,
 wherein the Class C fly ash is the only cementitious binder present in the composition and the CaO activator, if present, is present in an amount of ≤10 weight percent, based on the total dry weight of the composition.

33. The composition of claim 32, wherein the chemical activator consists of 1 to 7 weight percent sodium silicate activator, 1 to 3 weight percent sodium sulfate activator, 2 to 10 weight percent CaO activator, and 0.5 to 2 weight percent calcium chloride activator, based on the weight of the fly ash.

34. The composition of claim 32, wherein the composition further comprises at least one aggregate.

35. The composition of claim 32, wherein the composition is in the form of a cementitious paste without any aggregate.

* * * * *